(12) United States Patent
Frazer

(10) Patent No.: US 9,656,403 B2
(45) Date of Patent: May 23, 2017

(54) COLLAPSIBLE FINGERGUARD

(71) Applicant: Spencer Frazer, Lynnwood, WA (US)

(72) Inventor: Spencer Frazer, Lynnwood, WA (US)

(*) Notice: Subject to any disclaimer, the term of this patent is extended or adjusted under 35 U.S.C. 154(b) by 5 days.

(21) Appl. No.: 14/214,770

(22) Filed: Mar. 15, 2014

(65) Prior Publication Data
US 2014/0338196 A1 Nov. 20, 2014

Related U.S. Application Data

(60) Provisional application No. 61/798,365, filed on Mar. 15, 2013.

(51) Int. Cl.
B26B 1/00 (2006.01)
B25D 1/04 (2006.01)
B26B 29/00 (2006.01)
B26B 23/00 (2006.01)
B25G 1/10 (2006.01)
B23D 51/01 (2006.01)

(52) U.S. Cl.
CPC .............. *B26B 29/00* (2013.01); *B25G 1/102* (2013.01); *B26B 23/00* (2013.01); *B23D 51/01* (2013.01)

(58) Field of Classification Search
CPC ......... B26B 29/00; B26B 23/00; B25G 1/102; B23D 51/01
USPC ........ 30/125, 308.2, 143; 81/22; 7/145, 167, 7/159
See application file for complete search history.

(56) References Cited

U.S. PATENT DOCUMENTS

| | | | | |
|---|---|---|---|---|
| 2,105,239 A | * | 1/1938 | Bachtold | B25F 1/006 16/111.1 |
| 4,727,609 A | * | 3/1988 | Smith, Jr. | B25F 1/02 124/25 |
| 5,701,675 A | * | 12/1997 | Hall | B25G 1/08 30/123 |
| 6,240,642 B1 | * | 6/2001 | Templeton | A01G 3/08 30/125 |
| 6,718,586 B2 | * | 4/2004 | Corsini | B26B 23/00 7/143 |
| 7,647,701 B1 | * | 1/2010 | Mollick | B26B 1/04 30/155 |
| 8,286,356 B1 | * | 10/2012 | Mollick | B26B 1/042 30/155 |
| 8,479,612 B2 | * | 7/2013 | Sergyeyenko | B25C 11/00 7/143 |

* cited by examiner

*Primary Examiner* — Omar Flores Sanchez
(74) *Attorney, Agent, or Firm* — Forrest Law Office, P.C.; Brian Forrest

(57) ABSTRACT

A collapsible fingerguard tool is disclosed. In some embodiments, a tool with a handle includes an open channel within the handle to receive a second tool with a collapsible fingerguard, a flared section at an entry of the channel, and a second tool having a collapsible fingerguard, wherein the collapsible fingerguard is pivotably attached to the second tool at a pivot pin, the collapsible fingerguard also having a spring to open the fingerguard, wherein the fingerguard collapses adjacent to a handle of the second tool when the second tool is inserted into the open channel in the handle.

5 Claims, 7 Drawing Sheets

SECTION B-B

SECTION B-B

SECTION B-B

SECTION B-B

US 9,656,403 B2

COLLAPSIBLE FINGERGUARD

RELATED APPLICATIONS

This application claims the benefit of U.S. Provisional Application No. 61/798,365, filed Mar. 15, 2013.

BACKGROUND

Guards have been used to fixed blade knives and some tools that are in a fixed position or have a unitary construction, such as a classic wooden handled handsaw. Recently, tools are being combined with other tools and are also being created to have a smaller or more portable form factor. Currently these smaller form factor tools lack adequate guards for a user of the tool. This is particularly the case then the tool fits inside of another tool, such as a saw placed within the handle of a camping axe.

SUMMARY

Accordingly, a collapsible fingerguard is described below in the Detailed Description. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
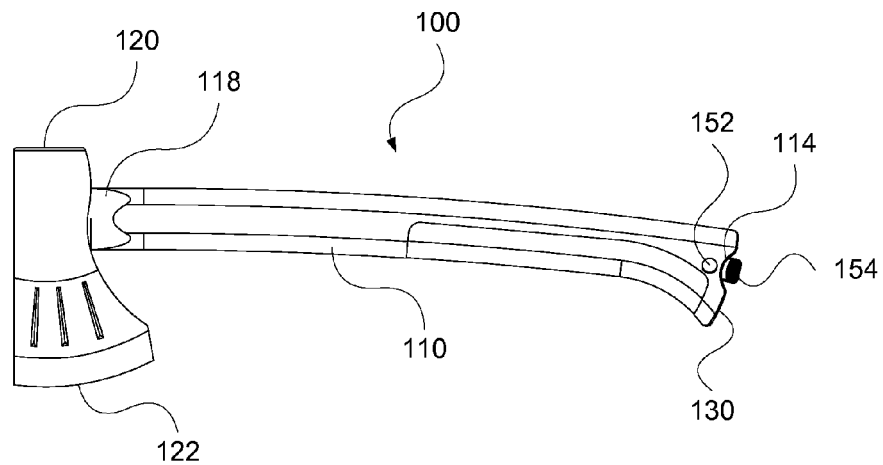
FIG. 1 is a side plan view of a one embodiment of an axe with a tool having a collapsible fingerguard placed within the handle of the axe.
Figure 2:
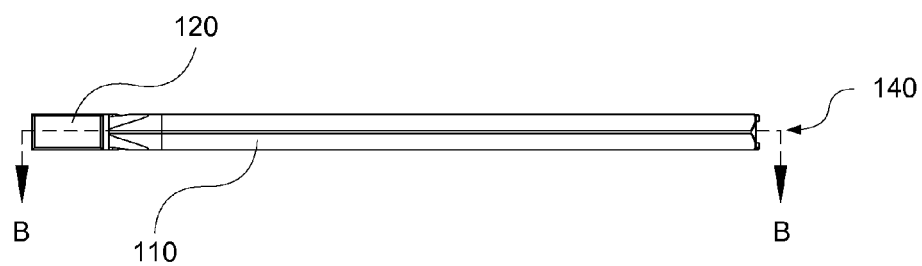
FIG. 2 is a back plan view of the embodiment axe in FIG. 1.
Figure 3:
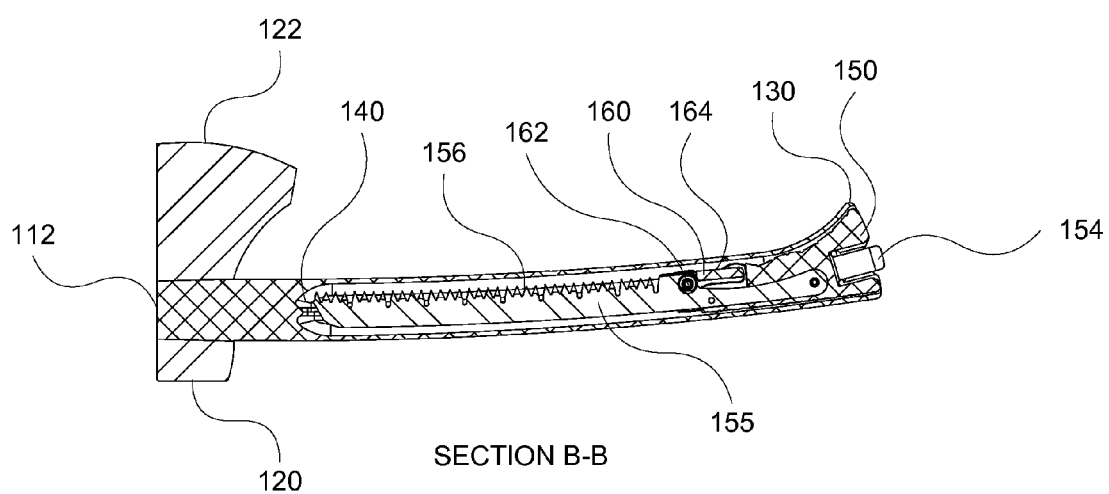
FIG. 3 is a side section view of the embodiment axe in FIG. 1 showing a saw with a collapsible fingerguard positioned within the axe handle.

FIG. 1 is a side plan view of a one embodiment of an axe 100 with a tool having a collapsible fingerguard placed within the handle 110 of the axe. FIG. 2 is a back plan view of the embodiment axe in FIG. 1 and FIG. 3 is a side section view of the embodiment axe in FIG. 1 showing a saw 150 with a collapsible fingerguard positioned within the axe handle 110. FIGS. 1-3 depicted packs 100 with a hollow handle 110, and a saw 150 inserted inside the axe handle 110. In the pictured embodiment, saw 150 is a handsaw with a collapsible finger guard. In the present embodiment, the tool with the collapsible finger guard is a saw however other embodiments are not so limited in a collapsible finger guard may be used in combination with other tools that can fit within axe handle 110.

In the present embodiment, axe 100 includes handle 110, hammer 120, blade 122, had connection joint 112, contoured handle 130. Additionally, saw includes blade 155 with teeth 156, pivot 162 coupled to collapsible finger guard 160, and 154. With reference to FIG. 3, saw 150 is fully inserted into axe handle 110. In this orientation, finger guard 160 is rotated about pivot when the fingerguard front 164 contacts a wedged inner surface of contoured handle 130 as saw 155 is inserted into handle 110. In this way, saw 155 can both have a safety finger guard 160 and also fit within axe and handle 110.

Figure 4:
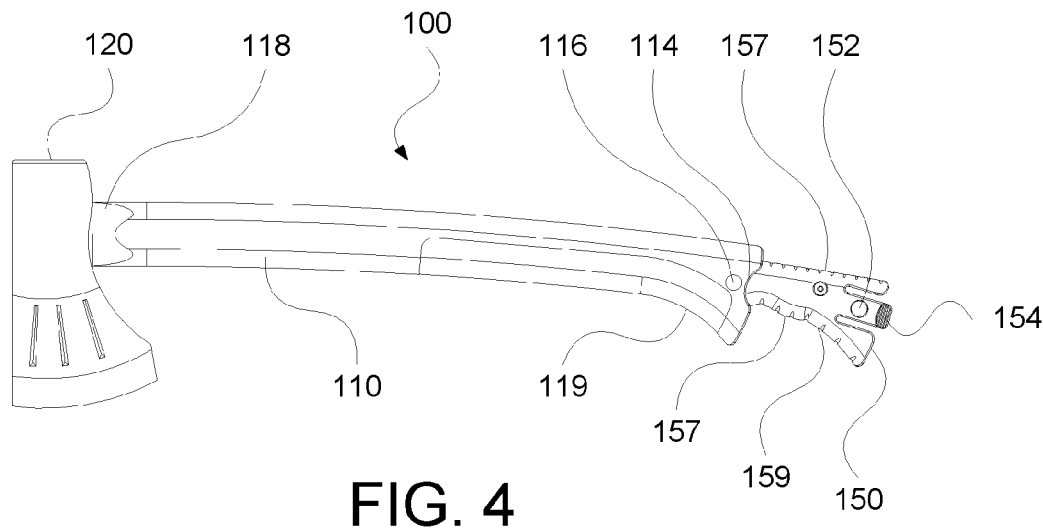
FIG. 4 is a side plan view of a one embodiment of an axe with a tool having a collapsible fingerguard partially placed within the handle of the axe.
Figure 5:
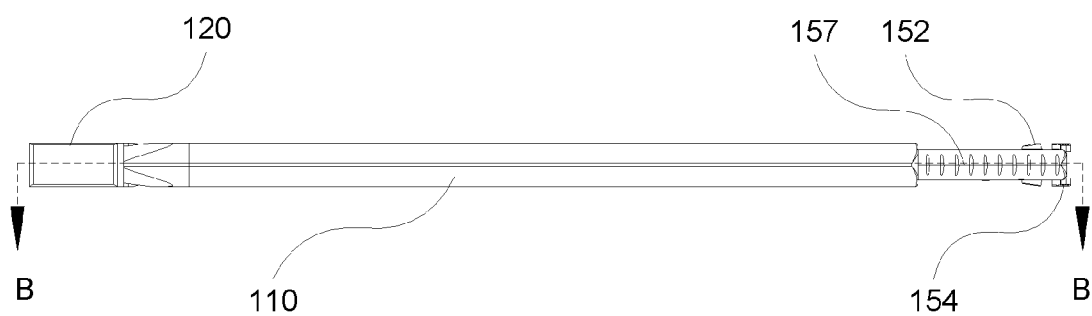
FIG. 5 is a back plan view of the embodiment axe in FIG. 4.
Figure 6:
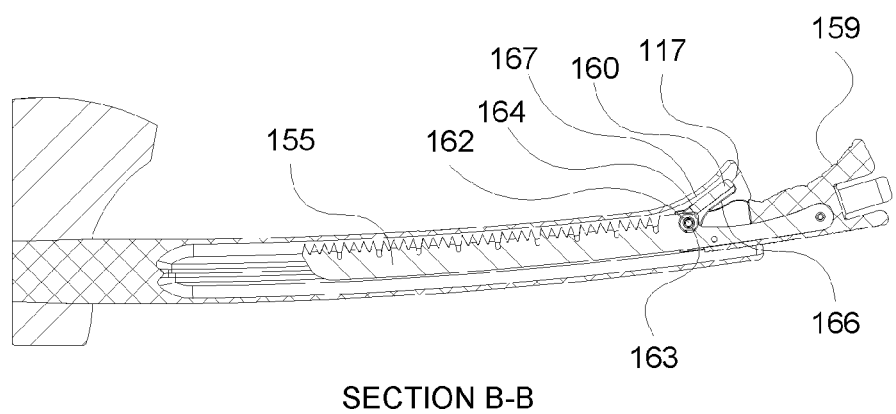
FIG. 6 is a side section view of the embodiment axe in FIG. 4 showing a saw with a collapsible fingerguard partially positioned within the axe handle.

We now turn to FIGS. 4-6 which show the saw partially placed within handle 110. FIG. 4 is a side plan view of a one embodiment of an axe with a tool having a collapsible fingerguard partially placed within the handle of the axe FIG. 5 is a back plan view of the embodiment axe in FIG. 4. FIG. 6 is a side section view of the embodiment axe in FIG. 4 showing a saw with a collapsible fingerguard partially positioned within the axe handle 110. FIG. 4 additionally shows tab 154 and a detent 152 that interlocks with the hole 116 and axe handle 110. Furthermore, handle 110 includes a contour 119 that corresponds to the contour 159 of the handle of saw 150. The inner surface 167 of contour 119 provides a secure stop for contour 159 such that detent 152 pops into hole 116.

The inner surface 167 of contour 119 also provides a ramp which closes the collapsible finger guard has saw 150 is inserted into handle 110. With reference to FIG. 6, collapsible finger guard 160 is shown with a curved surface 166 oriented towards the hand of a user, and a top surface 164 of collapsible finger guard 160 that presses against the inside of contour 119 and collapses the finger guard has saw 150 is inserted into handle 110. Pivot 162 includes a spring to push collapsible finger guard into the open position when not constrained by handle 110.

Figure 7:
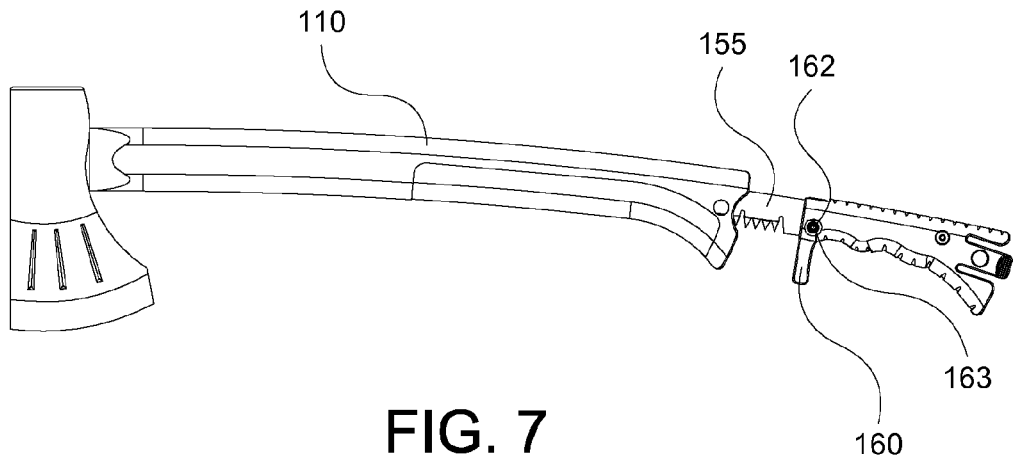
FIG. 7 is a side plan view of a one embodiment of an axe with a tool having a collapsible fingerguard positioned substantially outside the handle of the axe.
Figure 8:
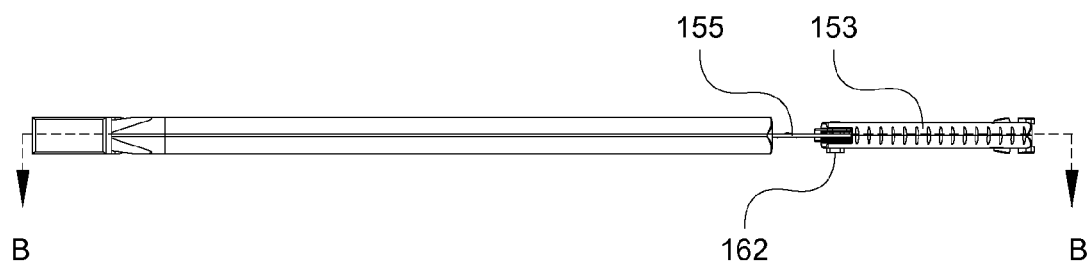
FIG. 8 is a back plan view of the embodiment axe in FIG. 7.
Figure 9:
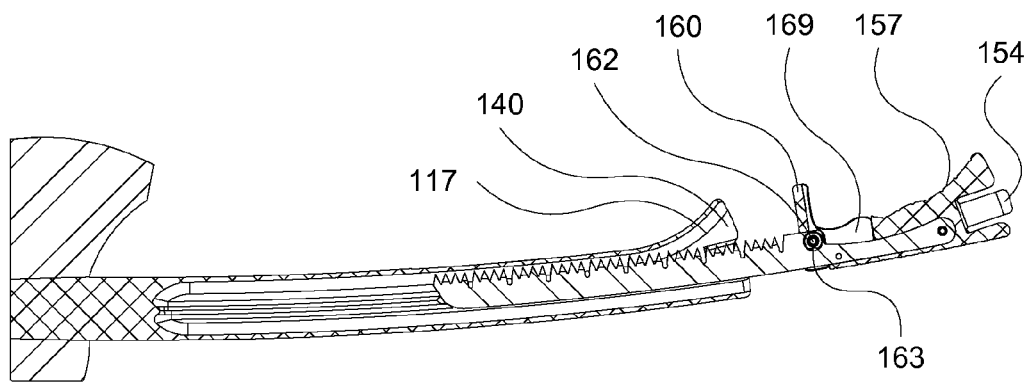
FIG. 9 is a side section view of the embodiment axe in FIG. 7 showing a saw with a collapsible fingerguard positioned substantially outside the axe handle.

We now turn to FIGS. 7-9 which show the saw partially placed within handle 110 but with the collapsible fingerguard 160 in an open position. FIG. 7 is a side plan view of a one embodiment of an axe with a tool having a collapsible fingerguard positioned substantially outside the handle of the axe. FIG. 8 is a back plan view of the embodiment axe in FIG. 7. FIG. 9 is a side section view of the embodiment axe in FIG. 7 showing a saw with a collapsible fingerguard positioned substantially outside the axe handle.

With reference to FIG. 9, saw 150 is partially pulled out of the cavity within handle 110 such that collapsible finger guard 160 is fully extended. In this view a cavity 169 in the handle of saw 150 can be seen that receives collapsible finger guard 160 when it is in a stowed position, for example when it is in handle 110. Therefore as saw 150 is pulled out of handle 110 the spring 163 around pivot 162 pushes collapsible finger guard 160 into the open position as it clears the inner surface 117 in handle 110.

Figure 10:
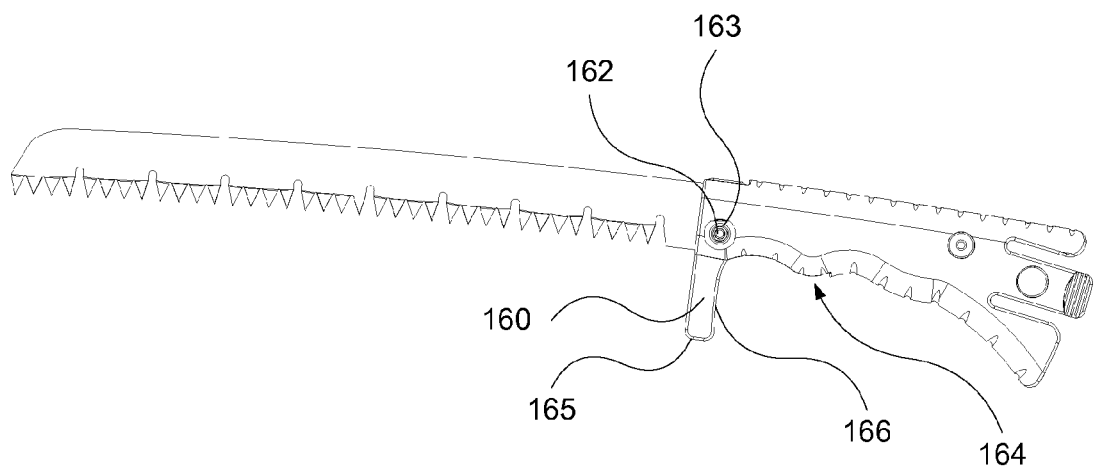
FIG. 10 is a side plan view showing the saw in FIG. 7 with a collapsible fingerguard in an open position.
Figure 11:
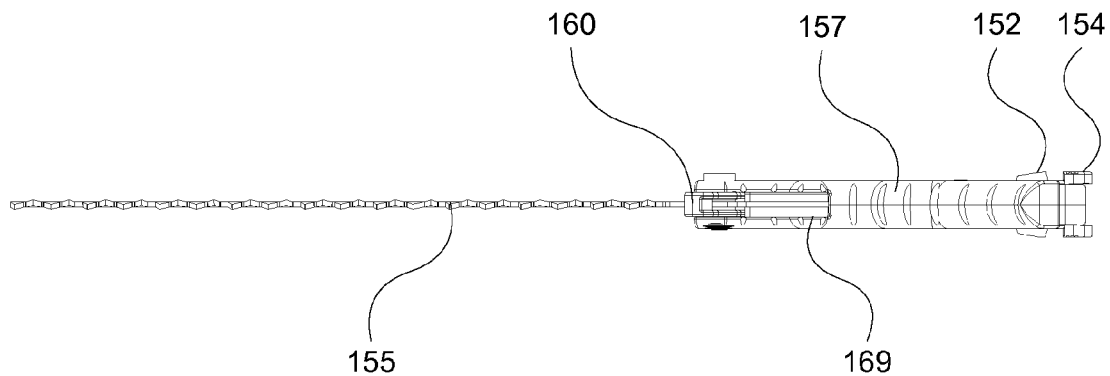
FIG. 11 is a front plan view showing the saw in FIG. 7 with a collapsible fingerguard in an open position.

FIG. 10 is a side plan view showing the saw in FIG. 7 with a collapsible fingerguard in an open position. FIG. 11 is a front plan view showing the saw in FIG. 7 with a collapsible fingerguard in an open position. With reference to FIG. 10 and FIG. 11, grip portion 164 of the handle of saw 150 includes a cavity 169 to receive collapsible finger guard 160 when in the stowed position. FIG. 11 more clearly shows tabs 154 and detent 152 that positively locks saw 150 into handle 110.

In the illustrated embodiment in FIG. 10, collapsible finger guard 160 has a beveled outer edge 165, a contoured finger portion 166 for comfort, and is aligned with the end of the handle of saw 150. In other embodiments, collapsible finger guard 160 may have a different geometry or may extend to a different angle than that shown in FIG. 10. In some embodiments, collapsible finger guard 160 may extend only right past the pivot or may extend all the way to the other end of the handle when in the open position. In an alternate embodiment, collapsible finger guard may have a hinge joint and may or may not have the collapsible finger guard 160 fit within cavity 169. For example, collapsible finger guard might wrap around the front of the handle of saw 150.

Figure 12:
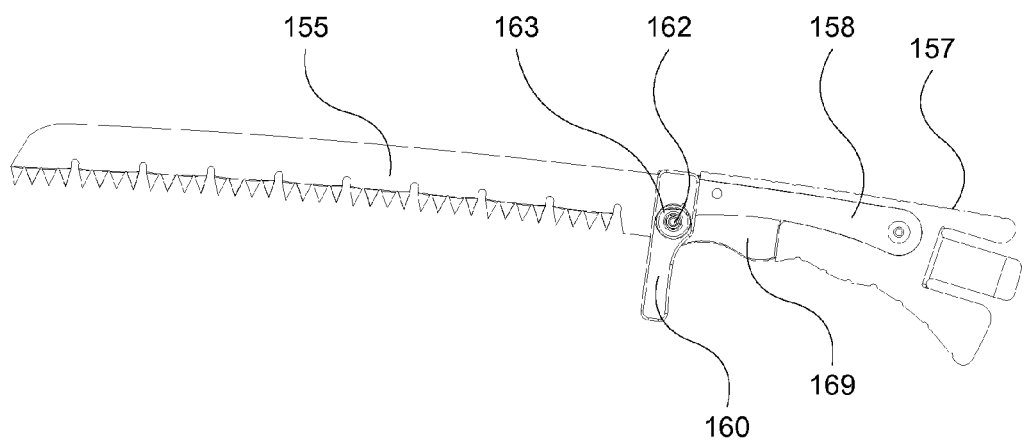
FIG. 12 is a side section view showing the saw in FIG. 7 with a collapsible fingerguard in an open position.
Figure 13:
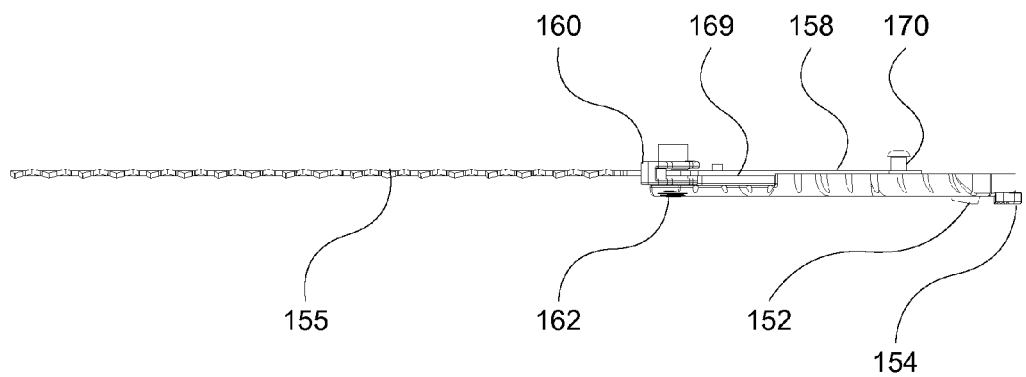
FIG. 13 is a front section view showing the saw in FIG. 7 with a collapsible fingerguard in an open position.

FIG. 12 is a side section view showing the saw in FIG. 7 with a collapsible fingerguard in an open position. FIG. 13 is a front section view showing the saw in FIG. 7 with a collapsible fingerguard in an open position. In FIG. 12, saw blade 155 is unitary with tang 158 which couples to handle 157 of saw 150, however other embodiments are not so limited. In the embodiment illustrated in FIG. 13, post 170 extends through tang 158 and is used to couple half of handle 157 to the other half not shown.

Figure 14:
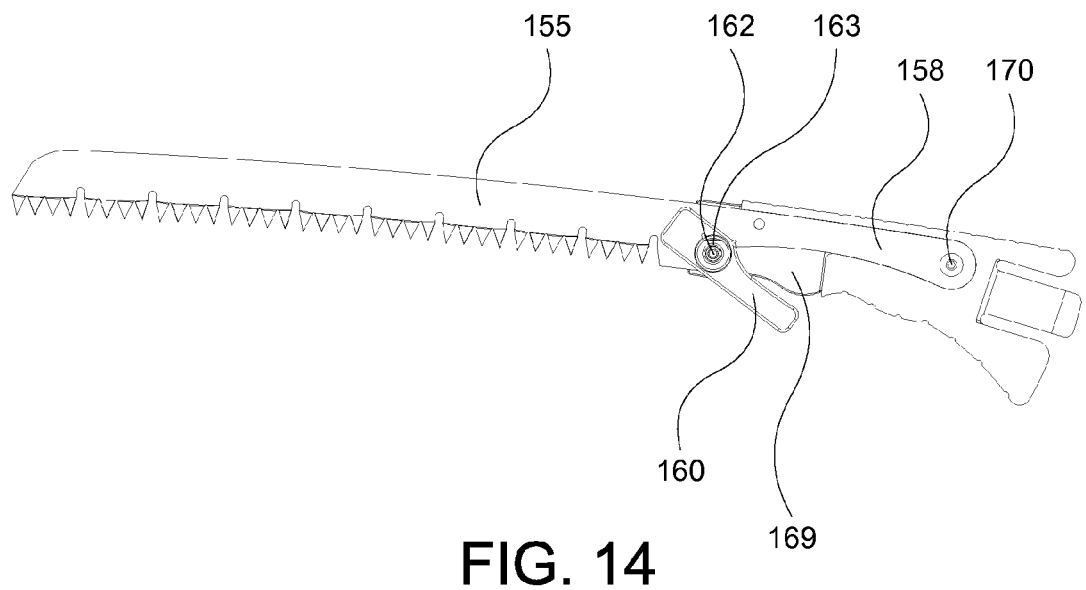
FIG. 14 is a side section view showing the saw in FIG. 7 with a collapsible fingerguard in a partially closed position.
Figure 15:
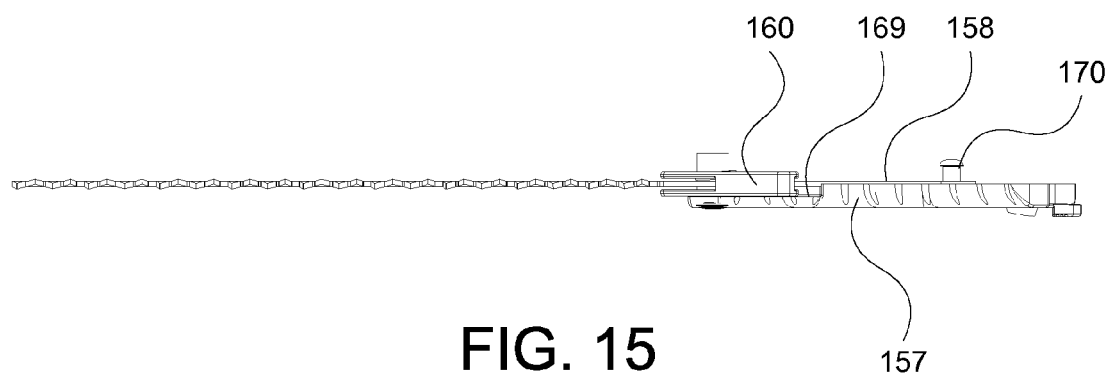
FIG. 15 is a front section view showing the saw in FIG. 7 with a collapsible fingerguard in a partially closed position.

FIGS. 14-15 are side section views showing the collapsible fingerguard 160 in a partially deployed position. FIG. 14 is a side section view showing the saw in FIG. 7 with a collapsible fingerguard in a partially closed position. FIG. 15 is a front section view showing the saw in FIG. 7 with a collapsible fingerguard in a partially deployed position. In FIG. 14, saw 150 is shown with collapsible finger guard 160 partially deployed and spring around spring 163 around pivot 162 being partially in tension. The illustrated position of collapsible finger guard 160 is the orientation collapsible finger guard has while it is being inserted into handle 110 and contacting inner surface 117, thus overcoming the spring force which deploys collapsible finger guard 160. In alternate embodiments, collapsible finger guard 160 may be moved to a close orientation without contacting a contoured inner surface such as 117. For example, a handle may simply have an open cavity 140 with a relatively consistent cross-section as you enter the handle.

Figure 16:
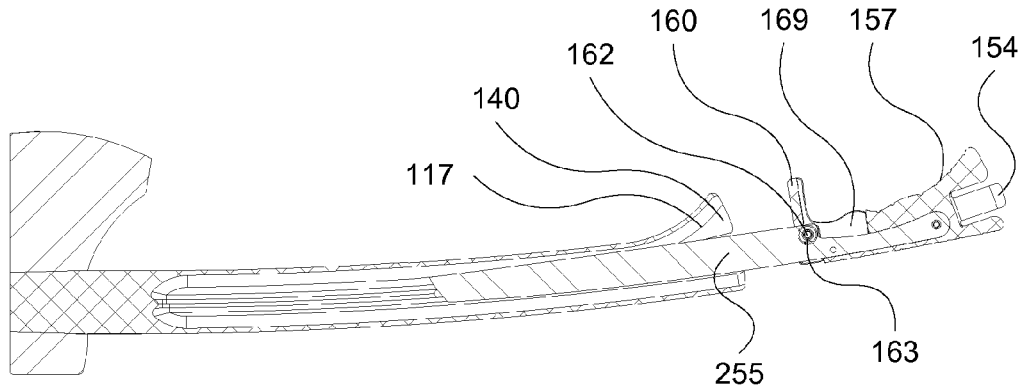
FIG. 16 is a side section view of an embodiment axe showing a knife with a collapsible fingerguard positioned substantially outside the axe handle.
Figure 17:
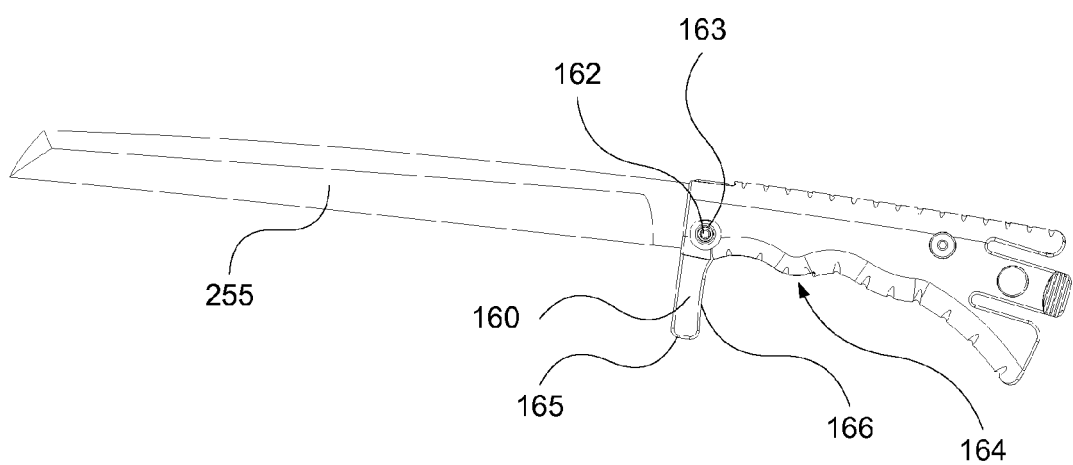
FIG. 17 is a side plan view showing the knife in FIG. 16 with a collapsible fingerguard in an open position.

While embodiments herein disclose a collapsible finger guard on a saw that is inserted within a similar collapsible finger guard within the principles of this disclosure may be on a tool other than a saw or implement that can be inserted inside a handle of a tool other than axe. That is, a tool that would benefit from a finger guard or a hand guard but is stored in a space conventionally smaller then would allow a finger guard or hand guard can therefore use a collapsible finger guard as is disclosed in the accent saw embodiment herein. As an example, FIG. 16 is a side section view of an embodiment axe showing a knife with a collapsible fingerguard positioned substantially outside the axe handle. FIG. 17 is a side plan view showing the knife in FIG. 16 with a collapsible fingerguard in an open position.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A first tool with a handle comprising:
   an open channel within the handle to receive a second tool with a collapsible fingerguard;
   an inner surface contour with a ramp at an entry of the open channel; and
   the second tool having a collapsible fingerguard, wherein the collapsible fingerguard is pivotably attached to the second tool handle at a pivot pin, the collapsible fingerguard also having a spring to open the fingerguard, wherein the inner surface contour with a ramp presses against the fingerguard causing the fingerguard to collapse adjacent to the second tool handle when the second tool is inserted into the open channel in the first tool handle.

2. The first tool of claim 1, wherein the handle has a hole and the second tool handle has a detent, and when the second tool handle is inserted into the open channel in the handle of the first tool the detent extends into the hole and secures the second tool within the first tool handle.

3. The first tool of claim 1, wherein the first tool is an axe.

4. The first tool of claim 1, wherein the second tool is a saw.

5. The first tool of claim 1, wherein the collapsible fingerguard of the second tool collapses adjacent to the second tool handle due to being pressed against the ramp on the inner surface contour of the open channel in the handle of the first tool.

\* \* \* \* \*